(12) United States Patent  
Funahashi et al.

(10) Patent No.: US 7,739,506 B2
(45) Date of Patent: Jun. 15, 2010

(54) AUTHENTICATION PROCESSING DEVICE AND SECURITY PROCESSING METHOD

(75) Inventors: Takeshi Funahashi, Saitama (JP); Shinichiro Futami, Kanagawa (JP)

(73) Assignee: Sony Corporation, Tokyo (JP)

( * ) Notice: Subject to any disclaimer, the term of this patent is extended or adjusted under 35 U.S.C. 154(b) by 1341 days.

(21) Appl. No.: 10/545,349

(22) PCT Filed: Jan. 29, 2004

(86) PCT No.: PCT/JP2004/000840

§ 371 (c)(1),
(2), (4) Date: Aug. 11, 2005

(87) PCT Pub. No.: WO2004/073252

PCT Pub. Date: Aug. 26, 2004

(65) Prior Publication Data

US 2006/0133605 A1 Jun. 22, 2006

(30) Foreign Application Priority Data

Feb. 14, 2003 (JP) ............................. 2003-037373

(51) Int. Cl.
*H04L 9/00* (2006.01)
(52) U.S. Cl. ...................................... 713/172
(58) Field of Classification Search ................ 380/29, 380/30, 44; 713/172, 282, 165, 167, 168, 713/182
See application file for complete search history.

(56) References Cited

U.S. PATENT DOCUMENTS 5,867,579 A * 2/1999 Saito .......................... 705/57

(Continued)

FOREIGN PATENT DOCUMENTS

JP 3-203432 9/1991

(Continued)

OTHER PUBLICATIONS

Shinichi Ikeno, Kenji Koyama, "Modern theory of cryptography", Japan, Corporate judicial person Institute of Electronics, Information and Communication Engineers, Nov. 15, 1997, First edition Sixth printing, p. 54-56.

(Continued)

*Primary Examiner*—Beemnet W Dada
(74) *Attorney, Agent, or Firm*—Frommer Lawrence & Haug LLP; William S. Frommer; Ellen Marcie Emas

(57) ABSTRACT

The present invention is relative with an authentication apparatus for performing security processing, based on PKI, responsive to the results of processing for authentication for the input information for authentication. The apparatus includes an inputting unit (12) for entering the information for authentication, an authenticating unit (21) for authenticating the information for authentication, entered by the inputting unit, a PKI processing unit (23) for generating a secret key and a public key based on the PKI (Public Key Infrastructure) system to perform preset security processing with the secret key generated, a storage unit (24), having a write only area in which the secret key generated by the PKI processing unit (23) is written and which cannot be read out from outside, and a secret key transmitting unit (25) for directly accessing the write only area of the storage unit (24) responsive to authentication of the information for authentication by the authentication unit (21), for transmitting the secret key written in it to the PKI processing unit (23).

45 Claims, 8 Drawing Sheets

U.S. PATENT DOCUMENTS

| | | | | |
|---|---|---|---|---|
| 6,098,055 | A | * | 8/2000 | Watanabe .................... 705/73 |
| 6,925,182 | B1 | * | 8/2005 | Epstein ...................... 380/277 |
| 7,024,563 | B2 | * | 4/2006 | Shimosato et al. .......... 713/186 |
| 2003/0005310 | A1 | * | 1/2003 | Shinzaki .................... 713/186 |
| 2004/0064698 | A1 | * | 4/2004 | Zhang ........................ 713/169 |

FOREIGN PATENT DOCUMENTS

| | | |
|---|---|---|
| JP | 3-282667 | 12/1991 |
| JP | 4-338859 | 11/1992 |
| JP | 10-247906 | 9/1998 |
| JP | 2000-188594 | 7/2000 |
| JP | 2000-196591 | 7/2000 |
| JP | 2001-357371 | 12/2001 |
| JP | 2002 258745 | 9/2002 |
| WO | WO 99 33219 | 7/1999 |

OTHER PUBLICATIONS

Published patent application No. HEI 3-203432 Akimichi Kurihara, Special edition Expeditionary party of biometrics, Approach of Sony, Case, Electronics, Japan, Ohm-sha Co., Ltd., Mar. 1, 2000, No. 550 (vol. 45 No. 3),p. 43-45.

Tatsuya Sasaki, "Technical report Test environment construction by a fingerprint authentication apparatus and tolerance test to a forgery fingerprint", Softechs, Jun. 2003, vol. 26, No. 1, p. 59-64 <Search day: Jun. 22, 2009>, URL,http://www.cac.co.jp/softechs/pdf/st2601_10.pdf.

* cited by examiner

AUTHENTICATION PROCESSING DEVICE AND SECURITY PROCESSING METHOD

TECHNICAL FIELD

This invention relates to a technique pertinent to PKI (Public Key Infrastructure) and, more particularly, to an authentication apparatus and a security processing method for carrying out security processing, based on PKI, responsive to the result of authentication for the input information being authenticated.

The present application claims priority of the Japanese Patent Application 2003-037373, filed in Japan on Feb. 14, 2003, the entirety of which is incorporated by reference herein.

BACKGROUND ART

There has so far been proposed a readily portable hardware token used for identifying a user based on PKI (Public Key Infrastructure), such as IC card or USB token. The PKI is a generic appellation of an infrastructure pertinent to the network security technique. Among the specified PKI techniques is a technique for carrying out data transmission/reception with an external apparatus as secrecy is accorded to data by a non-symmetrical encryption system employing a public key and a secret key.

It is assumed, for example, that data is transmitted/received in accordance with a non-symmetrical encryption system. The data transmitting side encrypts data with a public key to transmit data. The data receiving side, which has received the data, encrypted with the public key, is able to decrypt the encrypted data with a cipher key matched to the public key.

The public key is literally open at large such that anyone can acquire it. However, the secret key needs to be kept in safety so that it will not be stolen by a third party.

Hence, the aforementioned hardware token is usually formed by a mask ROM, so that the secret key cannot be read out on accessing from the personal computer PC.

Since the secret key needs to be kept in safety, an apparatus for data transmission/reception employing the PKI system is desirably provided with an authentication mechanism for verifying whether or not a user is an authorized user, based on a password or the information on the living body, as entered to the apparatus.

With the above-described hardware token, formed by a mask ROM, it is difficult to add an authentication mechanism because of many constraints imposed on the program structure.

DISCLOSURE OF THE INVENTION

It is an object of the present invention to provide a novel authentication apparatus and a security processing method whereby it is possible to solve the problems inherent in the above-described conventional; technique.

It is another object of the present invention to provide a novel authentication apparatus and a security processing method in which the PKI function is provided and illicit acquisition of a secret key is rendered difficult.

According to the present invention, there is provided a removable authentication apparatus connected to an external apparatus, comprising inputting means for inputting the information for authentication, authentication means for authenticating the information for authentication, entered by the inputting means, PKI processing means for generating a secret key and a public key based on a PKI (Public key Infrastructure) system for performing predetermined security processing with the secret key generated, storage means having a write-only area in which the secret key generated by the PKI processing means is written and which cannot be read out from outside, and secret key transmitting means for accessing directly to the write-only area of the storage means, responsive to authentication of the information for authentication, by the authentication means, and for transmitting the secret key written to the PKI processing means.

According to the present invention, there is also provided a security processing method for a removable authentication apparatus connected to an external apparatus, in which the method comprises a step of inputting the information for authentication, an authentication step of authenticating the information for authentication, entered by the inputting step, a key generating step of generating a secret key and a public key by PKI processing means performing predetermined security processing based on the PKI (Public Key Infrastructure) system, a write step of writing a secret key generated by the key generating step in storage means having a write only area from which readout from outside is not possible, and a secret key transmitting step of directly accessing the write only area of the storage means responsive to authentication of the information for authentication by the authentication step to transmit the written secret key to the PKI processing means.

According to the present invention, there is also provided a removable authentication apparatus connected to an external apparatus comprising inputting means for inputting the information for authentication, authentication means for authenticating the information for authentication, entered by the inputting means, PKI processing means for generating a secret key and a public key based on a PKI (Public key Infrastructure) system for performing predetermined security processing with the secret key generated, and storage means connected over a dedicated bus to the PKI processing means and having a write only area in which the secret key is written and which cannot be read out from outside. The PKI processing means reads out the secret key written in the write-only area of the storage means, over the dedicated bus, responsive to authentication by the authentication means of the information for authentication.

According to the present invention, there is provided a security processing method for a removable authentication apparatus connected to an external apparatus, in which the method comprises a step of inputting the information for authentication, an authentication step of authenticating the information for authentication, entered by the inputting step, a key generating step of generating a secret key and a public key by PKI processing means performing predetermined security processing based on the PKI (Public Key Infrastructure) system, and a writing step of writing a secret key, generated by the key generating step, in storage means connected over a dedicated bus to the PKI processing means, and having a write only area from which readout from outside is not possible. The PKI processing means reads out the secret key, written in the write only area of the storage means, over the dedicated bus, responsive to authentication by the authentication means of the information for authentication.

According to the present invention, there is also provided a removable authentication apparatus connected to an external apparatus, comprising inputting means for inputting the information for authentication, authentication means for authenticating the information for authentication, entered by the inputting means, PKI processing means for generating a secret key and a public key based on a PKI (Public key Infrastructure) system for performing predetermined security processing with the secret key generated, DES key generating means for generating a first DES key based on a DES (Data Encryption Standard) system, and storage means connected to the PKI processing means over a dedicated bus. The first DES key, generated by the DES key generating means, is written in the storage means. After generating the secret key, the PKI processing means reads out the first DES key, written in the storage means, over the dedicated bus, and encrypts the secret key, using the read out first DES key, to generate an encrypted secret key. The PKI processing means reads out the first DES key, written in the storage means, over the dedicated bus, responsive to authentication by the authentication means of the information for authentication, and decrypts the encrypted secret key into the secret key, using the read-out first DES key.

According to the present invention, there is also provided a removable authentication apparatus connected to an external apparatus, comprising inputting means for inputting the information for authentication, authentication means for authenticating the information for authentication, entered by the inputting means, PKI processing means for generating a secret key and a public key based on a PKI (Public key Infrastructure) system for performing predetermined security processing with the secret key generated, DES key generating means for generating a first DES key based on a DES (Data Encryption Standard) system, and storage means connected to the PKI processing means over a dedicated bus. The first DES key, generated by the DES key generating means, is written in the storage means. After generating the secret key, the PKI processing means reads out the first DES key, written in the storage means, over the dedicated bus, and encrypts the secret key, using the read out first DES key, to generate an encrypted secret key. The PKI processing means reads out the first DES key, written in the storage means, over the dedicated bus, responsive to authentication by the authentication means of the information for authentication, and decrypts the encrypted secret key into the secret key, using the read-out first DES key.

According to the present invention, there is also provided a security processing method for a removable authentication apparatus connected to an external apparatus, in which the method comprises a step of inputting the information for authentication, an authentication step of authenticating the information for authentication, entered by the inputting step, a key generating step of generating a secret key and a public key by PKI processing means performing predetermined security processing based on the PKI (Public Key Infrastructure) system, a DES key generating step of generating a first DES key based on the DES (Data Encryption System), and a write step of writing the first DES key, generated by the DES key generating step, in storage means connected over a dedicated bus to the PKI processing means. After generating the secret key, the PKI processing unit reads out the first DES key, written in the storage means, over the dedicated bus, and encrypts the secret key, using the read out first DES key, to generate an encrypted secret key. The PKI processing unit reads out the first DES key, written in the storage means, over the dedicated bus, responsive to authentication by the authentication step of the information for authentication, and decrypts the encrypted secret key into the secret key, using the read-out first DES key.

According to the present invention, there is also provided a removable authentication apparatus connected to an external apparatus, comprising inputting means for inputting the information for authentication, authentication means for authenticating the information for authentication, entered by the inputting step, PKI processing means for generating a secret key and a public key by a PKI (Public Key Infrastructure) system for performing predetermined security processing based on the PKI, DES key generating means for generating a first DES key based on the DES (Data Encryption System), storage means having a write only area from which readout from outside is not possible, the first DES key generated by the DES key generating means being written in the write only area, and DES key transmitting means for directly accessing the write only area of the storage means to transmit the first DES key written therein to the first PKI processing means. On generation of the secret key, the DES key transmitting means reads out the first DES key written in the write only area of the storage means to transmit the so read out first DES key to the PKI processing means. The PKI processing means decrypts the encrypted secret key to the secret key using the first DES key transmitted by the DES key transmitting means.

According to the present invention, there is also provided a security processing method for a removable authentication apparatus connected to an external apparatus, in which the method comprises a step of inputting the information for authentication, an authentication step of authenticating the information for authentication, entered by the inputting step, a key generating step of generating a secret key and a public key by PKI processing means performing predetermined security processing based on the PKI (Public Key Infrastructure) system, a DES key generating step of generating a first DES key based on the DES (Data Encryption System), a write step of writing the first DES key generated by the DES key generating step in storage means having a write only area from which readout from outside is not possible, and a DES key transmitting step of directly accessing the write only area of the storage means to transmit the written secret key to the PKI processing means. On generation of the secret key, the DES key transmitting step reads out the first DES key written in the write only area of the storage means to transmit the so read out first DES key to the PKI processing means. The PKI processing step encrypts the first DES key to generate an encrypted secret key using the first DES key transmitted by the DES key transmitting means. The DES key transmitting step reads out the first DES key written in the storage means, responsive to authentication by the authentication step of the information for authentication. The PKI processing means decrypts the encrypted secret key to the secret key using the first DES key transmitted by the DES key transmitting step.

Other objects and advantages of the present invention will become more apparent from the following explanation of the preferred embodiments especially when read in conjunction with the accompanying drawings.

BEST MODE FOR CARRYING OUT THE INVENTION

Figure 1:
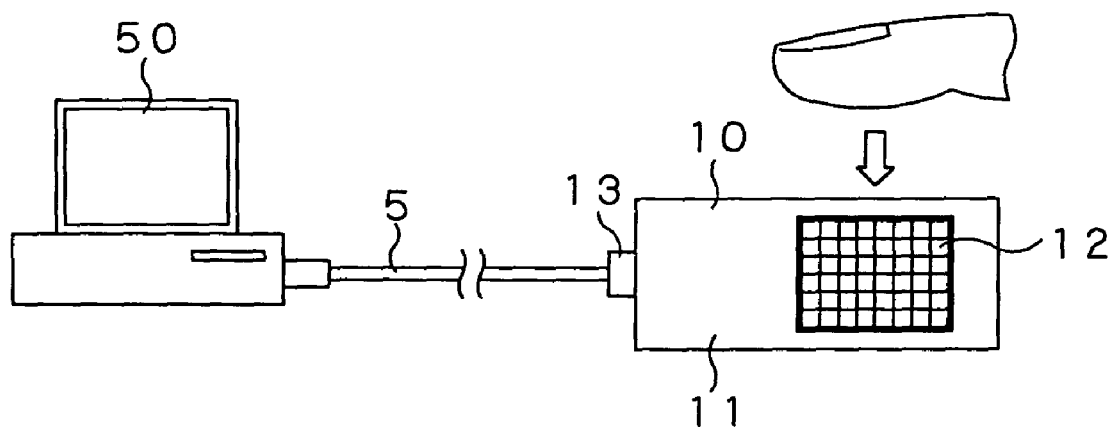
FIG. 1 schematically shows a structure of a fingerprint collating apparatus according to the present invention.

Referring to the drawings, the authentication apparatus and the security processing apparatus according to the present invention will now be explained in detail.

Referring first to FIGS. 1 to 5, a fingerprint collating apparatus 10, forming the authentication apparatus according to the present invention, is explained.

The fingerprint collating apparatus 10, according to the present invention, is configured as shown in FIG. 1. That is, the fingerprint collating apparatus 10 includes a casing 11 provided with a fingerprint readout sensor 12 for reading out the fingerprint information of the finger. The fingerprint collating apparatus 10 also includes an input/output interface 13, by which the apparatus is connected over a cable 5 to an external device, such as a personal computer 50, in order to effect data transmission/receipt. The fingerprint collating apparatus 10 is configured so as to be portable/removable.

The personal computer 50 (PC) includes a function for connection to a network, although such function is not shown, and is able to have data transmission/ receipt freely with e.g. a terminal device the PC is connected to.

Figure 2:
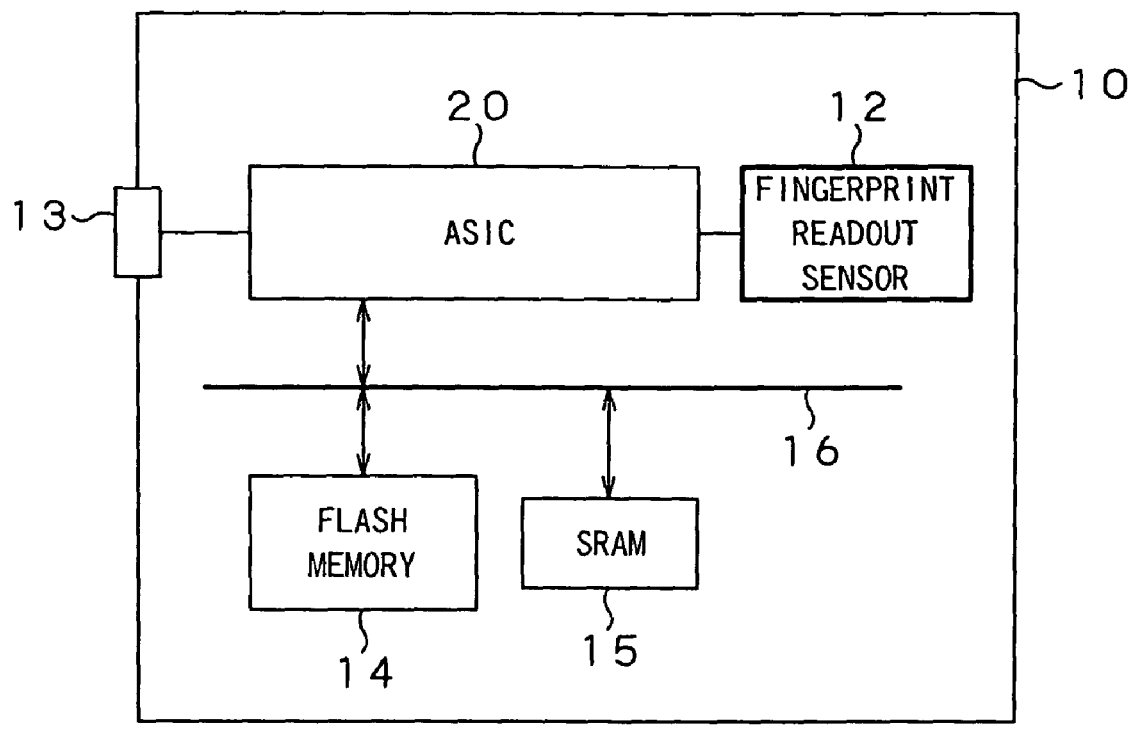
FIG. 2 is a block diagram showing the structure of a fingerprint collating apparatus.

Referring to FIG. 2, the structure of the fingerprint collating apparatus 10 will now be explained.

The fingerprint collating apparatus 10 includes a fingerprint readout sensor 12, an input/output sensor 13, a flash memory 14, an SRAM (static random access memory) 15, and an ASIC (Application Specific Integrated Circuit) 20.

The fingerprint readout sensor 12, input/output sensor 13, flash memory 14, SRAM 15 and the ASIC 20 are interconnected over a bus 16.

The fingerprint readout sensor 12 is a semiconductor sensor for reading ridges and grooves of the fingerprint of a finger placed thereon, that is, a pattern of the fingerprint.

For example, the fingerprint readout sensor 12 detects the fingerprint pattern in accordance with a electrostatic capacitance system to generate a two-dimensional image. The fingerprint readout sensor 12 of the electrostatic capacitance system is provided with a number of electrodes, at a pitch of 80 μm, which is sufficiently finer than the pitch of the ridges and grooves of the fingerprint. The fingerprint readout sensor detects the fingerprint pattern and the quantity of charges (capacitance) stored across the electrodes. Since the capacitance detected becomes lower and higher in the grooves and ridges of the fingerprint, respectively, a two-dimensional image, representing the fingerprint pattern, may be generated from this difference in the capacitance.

The input/output sensor 13 is an interface which is based on e.g. the standard of the USB (Universal Serial Bus). The standard for the input/output sensor 13 may also be any suitable standard other than USB, for example, RS232C.

In the flash memory 14 and in the SRAM 15, there is stored a control firmware which is read out by the CPU in the ASIC 20, as later explained, and which is adapted for comprehensively controlling the fingerprint collating apparatus 10.

In the flash memory 14, there is also stored template data as the fingerprint information operating as a reference for fingerprint collation. In executing the fingerprint collation, using the fingerprint collating apparatus 10, the user has to register his/her fingerprint information in the flash memory 14 from the outset. The fingerprint information, stored in this flash memory 14, is the template data which is the extraction of features of the fingerprint image.

Figure 3:
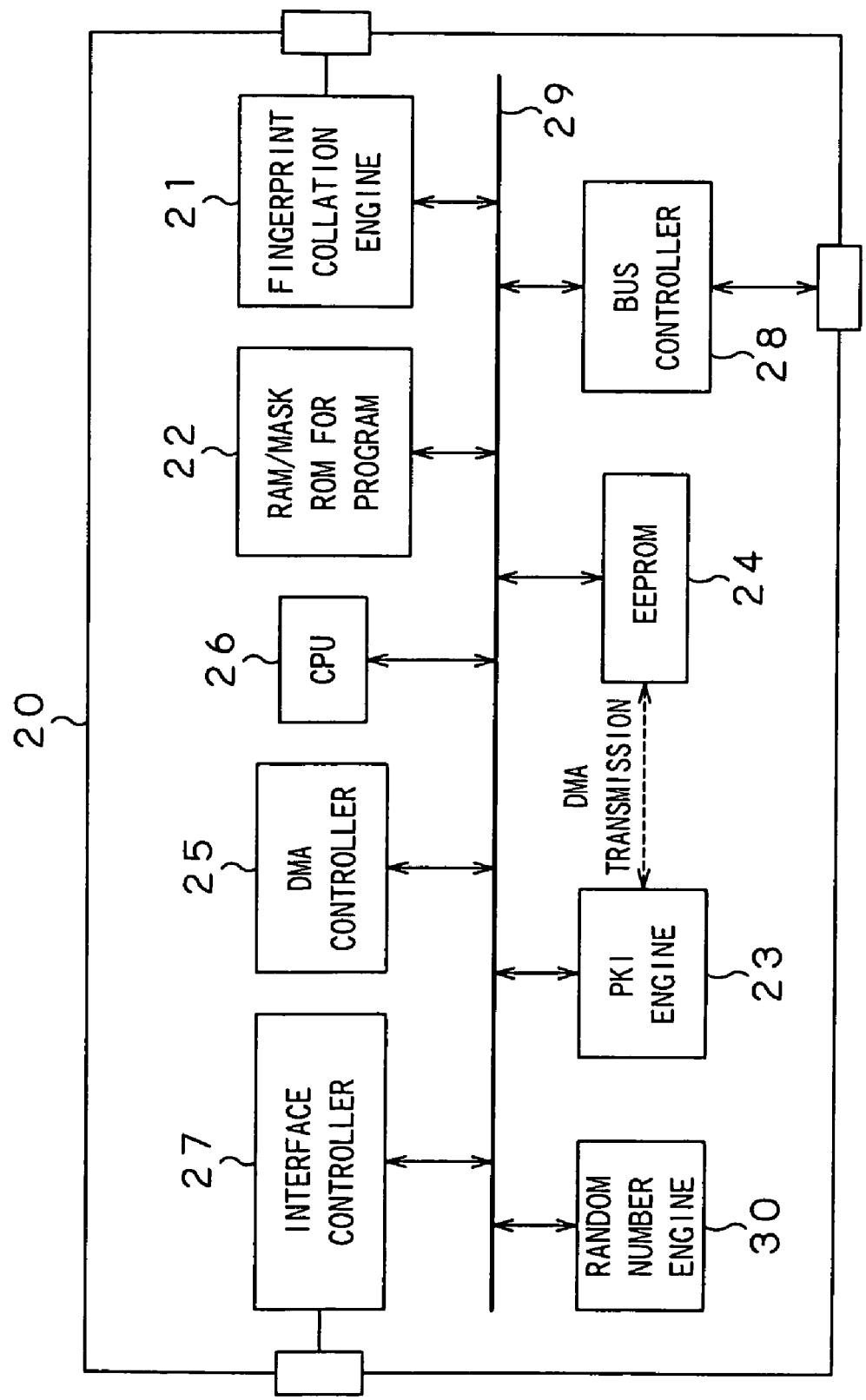
FIG. 3 is a block diagram showing a first structure of the ASIC provided to the fingerprint collating apparatus.

Referring to FIG. 3, the structure of the ASIC 20 will now be explained.

The ASIC 20 includes a fingerprint collation engine 21, a RAM (random access memory)/mask ROM (read-only memory) for a program 22, a PKI (Public Key Infrastructure) engine 23, an EEPROM (electrically erasable programmable read-only memory) 24, a DMA (direct memory access) controller 25, a CPU (central processing unit) 26, an interface controller 27, a bus controller 28, and a random number engine 30. The ASIC 20 is an IC of high tamper-proofness in which there is no risk of data leakage caused by interconnection or the like operation.

The fingerprint collation engine 21, RAM for program mask ROM 22, PKI engine 23, EEPROM 24, DMA controller 25, CPU 26, interface controller 27, bus controller 28 and the random number engine 30 are interconnected over an internal bus 29.

In carrying out fingerprint collation, the fingerprint collation engine 21 reads out the template data, which is the extraction of only the features of the fingerprint image stored from the outset in the flash memory 14, and compares the fingerprint image, as detected by the fingerprint readout sensor 12, to the read-out template data, by way of performing the collation. The results of comparison for collation, obtained by the fingerprint collation engine 21, are notified to the CPU 26.

It is again with the aid of the fingerprint collation engine 21 that the template data, which is the extraction of the feature information of the fingerprint image, is stored in the aforementioned flash memory 14.

The RAM/mask ROM for a program 22 is a memory having stored therein a firmware used by the CPU 26 carrying out the fingerprint collation.

The PKI engine 23 executes the processing pertinent to security, employing the secret key based on PKI, such as data signing, data encryption, and decryption of data encrypted by a public key. Meanwhile, the data signing, data encryption and decryption of data encrypted by a public key, carried out by the fingerprint collating apparatus 10, will be explained subsequently in detail.

Figure 4:
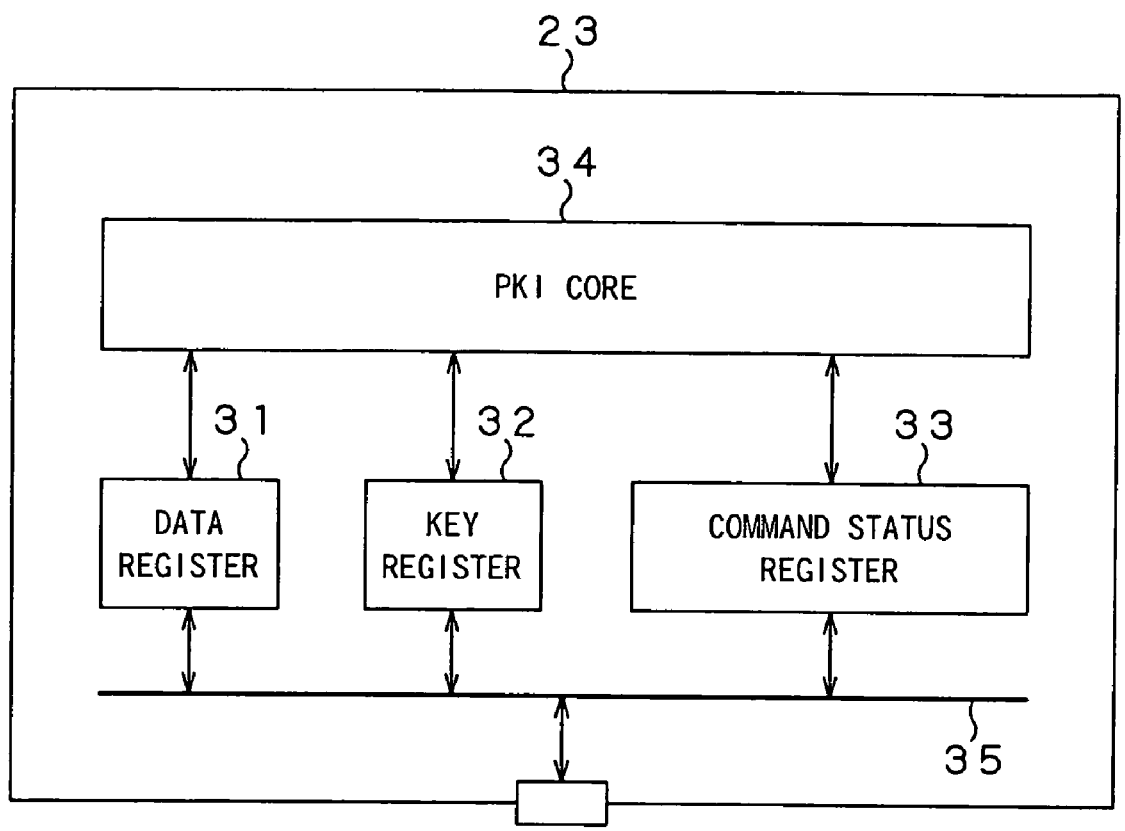
FIG. 4 is a block diagram showing a first structure of a PKI engine within the ASIC.

Referring to FIG. 4, the structure of the PKI engine 23 is now explained.

The PKI engine 23 includes a data register 31, a key register 32, a command status register 33 and a PKI core 34.

The data register 31, key register for encryption/decryption 32 and the command status register 33 are interconnected over an internal bus 35. The PKI core 34 is separately connected to the data register 31, key register 32 and to the command status register 33.

The data register 31 is used for transient storage of data processed by the PKI core 34 in the data signing, data encryption, or in the decryption of encrypted data.

The key register 32 is used for transient storage of a key, such as a secret key, read out and transmitted by the DMA controller 25.

The command status register 33 is used for transient storage of a preset command for the PKI core 34, output from the CPU 26 during the data signing, data encryption or decryption of encrypted data.

The PKI core 34 executes the data signing, data encryption or decryption of encrypted data. On receipt of a key generating command from the CPU 26 via command status register 33, the PKI core 34 generates a key pair, namely a public key and a secret key, based on e.g. the RSA (Rivest Shamir Adleman) system, which is among the PKI systems. The so generated secret key is transmitted to a preset storage area of the EEPROM 24, as later explained, under control by the DMA controller 25. The public key is delivered to the PC 50. This generation of the secret key and the public key is the initial setting carried out by a user employing the fingerprint collating apparatus 10.

Meanwhile, the PKI system, employed by the PKI core 34, is not limited to the above-described RSA system, such that any other suitable system, exemplified by the Diffie-Hellman (DH) system or the elliptical curve cryptography (ECC) system, may also be used.

The EEPROM 24 is a rewritable ROM in which the prerecorded information can be erased electrically.

Figure 5:
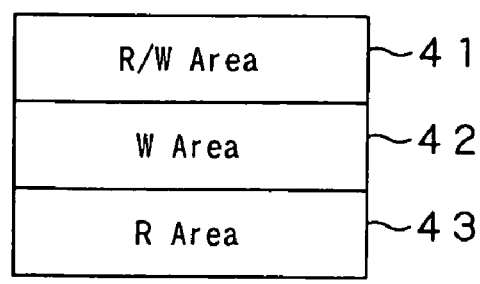
FIG. 5 shows a memory area of an EEPROM within the ASIC.

FIG. 5 schematically shows a data storage area of the EEPROM 24. The EEPROM 24 includes a R/W area 41, for read/write from outside, a W area 42, for write only, and a read area for read only.

The W area 42 is an area for data write only, as described above. In this W area 42, the secret key, generated by the PKI., is written via DMA controller 25, under control by the CPU 26.

For the CPU 26, the W area 42 operates as a write-only area. Hence, the secret key cannot be read out by the CPU 26. The secret key, written in the W area 42, may be read out only by direct access by the DMA controller 25.

In the R area 43, either a serial number is written and saved, or an ID (identification) specifying the fingerprint collating apparatus 10 is written and saved, at the time of shipment of the fingerprint collating apparatus 10. The R area 43 permits data writing by setting a specified pin of the ASIC 20 to the plus side. The R area 43 again proves a read-only area by setting the above-mentioned specified pin to the GND side.

Reverting to FIG. 3, the configuration of the ASIC 20 is explained.

The DMA controller 25 executes transmission of the secret key between the W area 42 of the EEPROM 24 and the PKI engine 23 over the internal bus 29. The secret key transmission by the DMA controller 25 is executed independently of the processing by the CPU 26, while the CPU 26 is unable to take part in the secret key transmission by the DMA controller 25.

The CPU 26 executes the firmware stored in the RAM for program/mask ROM 22, by way of controlling the fingerprint collation, while executing the firmware stored in the flash memory 14 and in the SRAM 15, by way of comprehensively controlling the operation of the fingerprint collating apparatus 10.

The interface controller 27 controls the data transmission with the external device 50, such as PC 50, the interface controller is connected to, over the input/output interface 13 and the cable 5, based on the Interface protocol.

The bus controller 28 controls data entered to or output from the ASIC 20. The random number engine 30 generates a DES key, which is a common key based on the DES (Data Encryption Standard) system, that is, on the symmetrical encryption system. The random number engine 30 is responsive to control by the CPU 26 to generate a 56-bit random number, which is used as the DES key.

The symmetrical encryption system encrypts data or decryptes the encrypted data, using a symmetrical key, that is, a common key.

In this manner, the fingerprint collating apparatus 10 is responsive to the results of fingerprint collation to transmit the secret key to the PKI engine 23, solely by the DMA controller 25. Thus, the fingerprint collating apparatus 10 is able to execute security processing, based on the PKI system, run on the PKI engine 23 of the ASIC 20, responsive to the results of fingerprint collation.

The data signing processing in the fingerprint collating apparatus 10 is now explained.

This data signing is the so-called digital signature, carried out for identifying the transmitting entity in case certain data is transmitted from the PC 50 to an external apparatus over a network. A receiving entity, which has received data processed with data signing, is able to execute data verification for identifying the transmitting entity.

Figure 6:
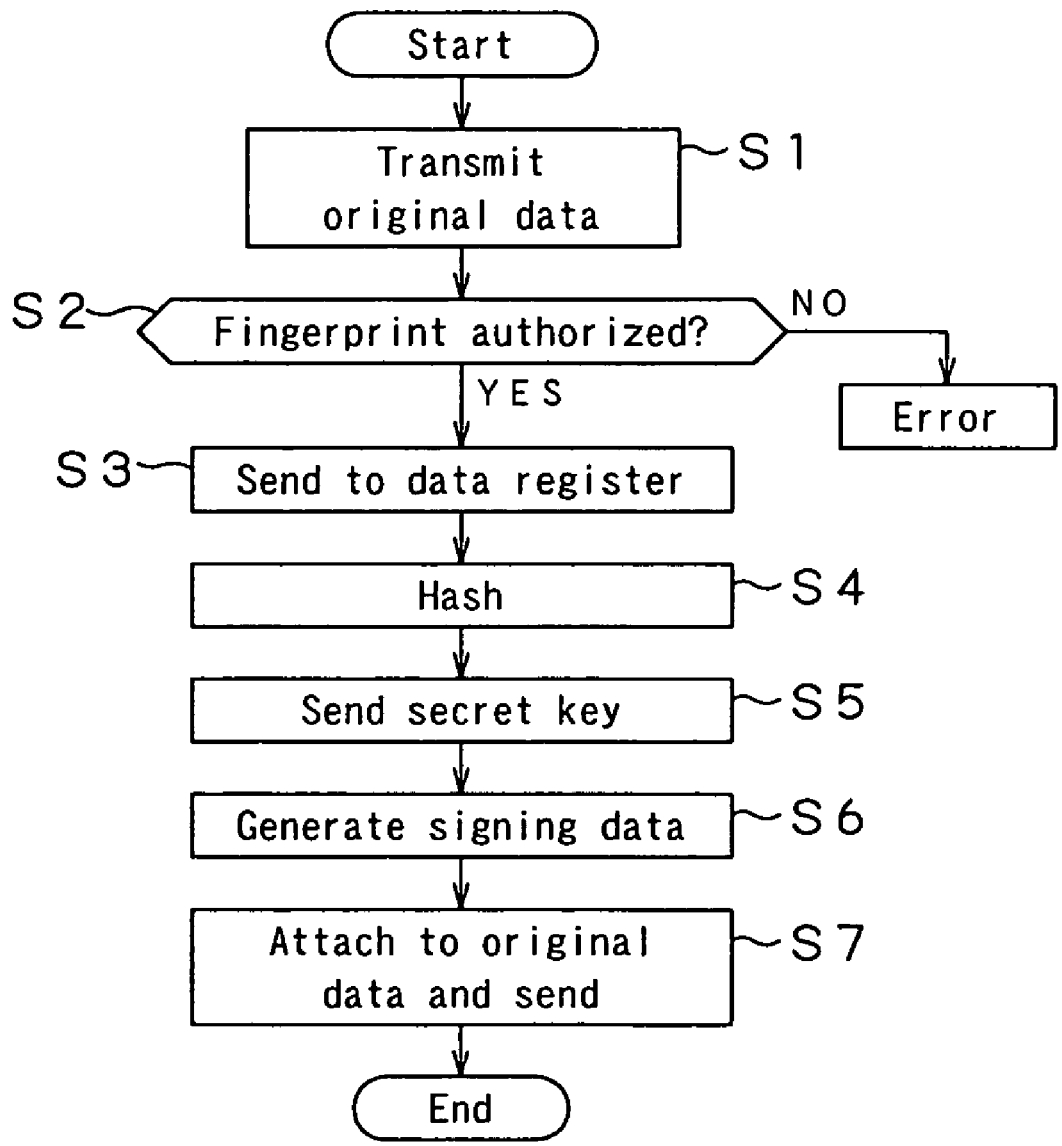
FIG. 6 is a flowchart showing the operation of data signing.

Referring to the flowchart of FIG. 6, the operation in effecting the data signing on the fingerprint collating apparatus 10 is now explained.

It is assumed here that the PC 50, shown in FIG. 1, is connected to the network, and that preset data is transmitted to the external apparatus over the network. It is also assumed that the registration of the user's fingerprint as well as the writing of the secret key in the W area 42 of the EEPROM 24 has already been completed.

First, in a step S1, original data to be data-signed is transmitted from the PC 50 over the cable 5 and the input/output interface 13 to the fingerprint collating apparatus 10. Responsive to transmission of the original data from the PC 50, a message prompting the user to set his/her finger on the fingerprint readout sensor 12 is displayed on a monitor screen of the PC 50.

In a step S2, the fingerprint readout sensor 12 detects a fingerprint image of the finger set thereon. Then, using the fingerprint collation engine 21, the fingerprint image as detected is compared and collated to template data stored in the flash memory 14. In case the fingerprint image of the finger set on the fingerprint readout sensor 12 has been authorized, processing transfers to a step S3 and, if otherwise, the process is determined to be an error.

In the step S3, the original data is sent out to the data register 31 of the PKI engine 23. At this time, a hashing command is sent from the CPU 26 via command status register 33 to the PKI core 34 of the PKI engine 23.

In a step S4, the PKI core 34 is responsive to the hashing command to read out original data stored in the data register 31. The so read out original data is entered to a hashing function to generate hashed data. The so generated hashed data is temporarily returned to the CPU 26. The hashing function is a unidirectional function, such as MD5 (Message Digest #5) or SHA (Secure Hash Algorithm). However, the above is merely illustrative and any other suitable hash function may be used.

In a step S5, the CPU 26 sends the hashed data to the data register 31 of the PKI engine 23. The DMA controller 25 at this time reads out the secret key stored in the W area 42 of the EEPROM 24 to send the so read out secret key to the key register 32 of the PKI engine 31.

When a signing command has been sent in a step S6 from the CPU 26 via command status register 33 to the PKI core 34, the PKI core 34 reads out the hashed data stored in the data register 31 and the secret key stored in the key register 32 to carry out the encryption processing to generate signing data.

In a step S7, the PKI core 34 sends out the generated signing data to the CPU 26. The CPU 26 sends out the signing data to the CPU 50 so that the PC 50 is able to acquire the signing data, that is, digital signature, appended to the original data. The PC 50 sends the original data, the digital signature has been appended to, over the network to the external device.

Meanwhile, the external device, which has received the original data, the digital signature has been appended to, executes data verification to verify whether or not the data is that sent from the entity which has made the signing.

The data verification in the fingerprint collating apparatus 10, which has received the original data, the digital signature has been appended to, will now be explained.

First, original data are sent out to the PKI engine 23, and hashed data are generated in the PKI core 34. The PKI core 34 then is able to decrypt the signing data with a public key to effect verification based on whether or not the signing data decrypted by the public key is coincident with the hashed data.

The operation of data encryption by the fingerprint collating apparatus 10 will now be explained.

In encrypting data, a DES key is first generated by the random number engine 30.

The original data then is encrypted, using the generated DES key, to generate encrypted data. The PKI engine 23 encrypts the DES key, from which the encrypted data has been generated, with the secret key read out by the DMA controller 25 from the EEPROM 24, to generated encrypted key data.

Thus, for reading out the secret key by the DMA controller 25, it is prerequisite that fingerprint collation has been made by the fingerprint collation engine 21.

Finally, the data encrypted by the DES key and the encrypted key data, corresponding to the DES key encrypted using the secret key, are transmitted to the counterpart entity.

The data receiving entity decrypts the encrypted key data, into a DES key, using the public key, matched to the secret key, and decrypts the encrypted data with the decrypted DES key, to acquire the original data.

The operation of decrypting the original data, transmitted thereto on encryption with the public key, in the fingerprint collating apparatus 10, will now be explained.

The encrypted data, obtained on encryption of the original data with the public key, is sent out to the PKI engine 23. The encrypted data, sent out to the PKI engine 23, is decrypted to the original data by the secret key read out from the EEPROM 24 by the DMA controller 25. Similarly, when the secret key is to be read out by the DMA controller 25, it is a prerequisite that the fingerprint collation by the fingerprint collating engine 21 has already been finished.

In this manner, in case the user's fingerprint has been authenticated by the fingerprint collating engine 21, the fingerprint collating apparatus 10 is able to execute various security processing operations, based on the PKI system, by the secret key being read out from the W area 42 of the EEPROM 24 by the DMA controller 25.

Figure 7:
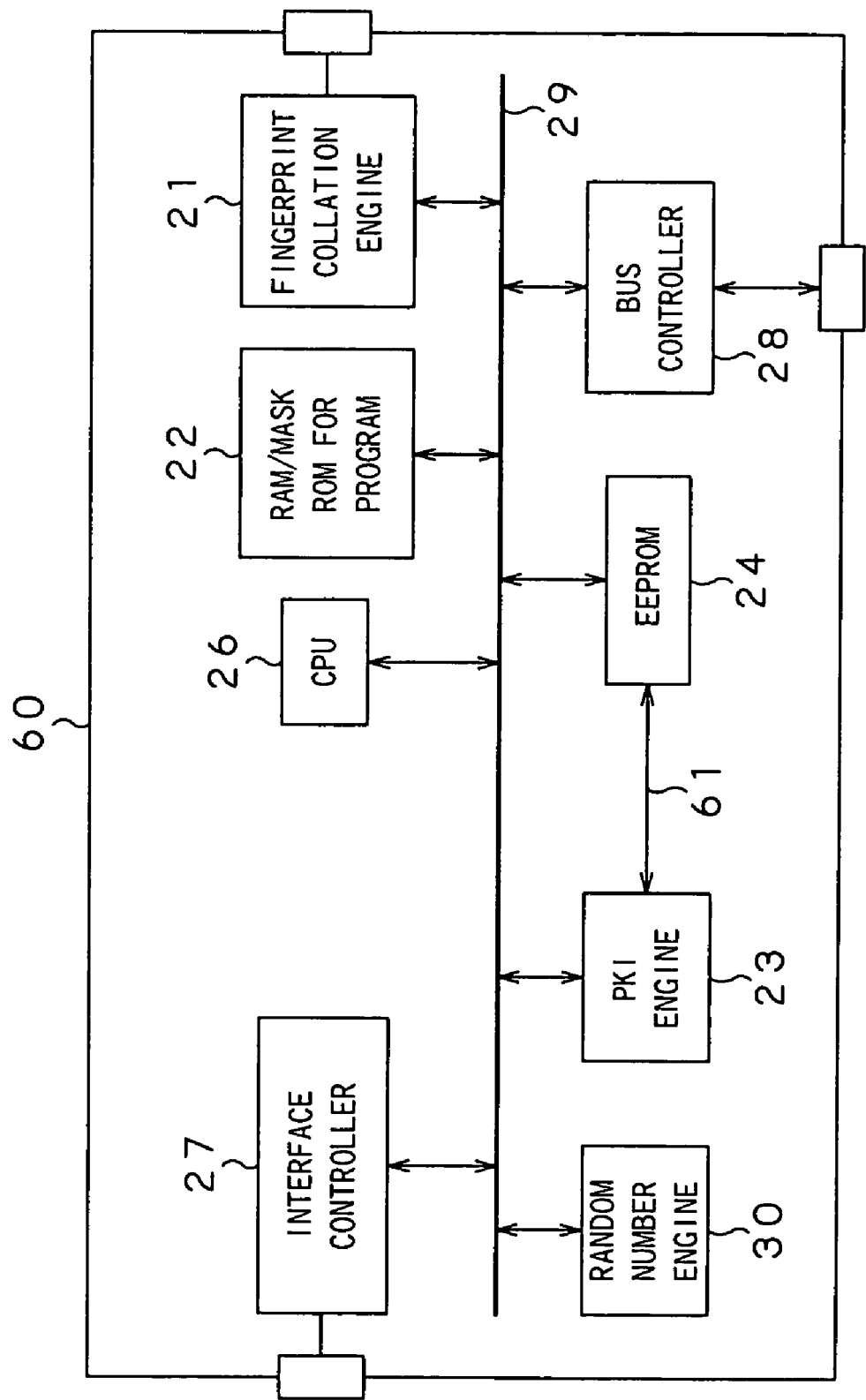
FIG. 7 is a block diagram showing a second structure of the ASIC provided to the fingerprint collating apparatus.

The ASIC 20 of the fingerprint collating apparatus 10 may be configured as an ASIC 60 shown in FIG. 7.

The ASIC 60 corresponds to the ASIC 20 less the DMA controller 25, with the EEPROM 24 being connected to the PKI engine 23 over a dedicated bus 61. With the PKI engine 23 and the EEPROM 24 interconnected over the dedicated bus 61, the PKI engine 23 is able to read out the secret key from the W area 42 of the EEPROM 24 to carry out the security processing based on the PKI system, in case the user's fingerprint has been authorized by the fingerprint collation engine 21.

Figure 8:
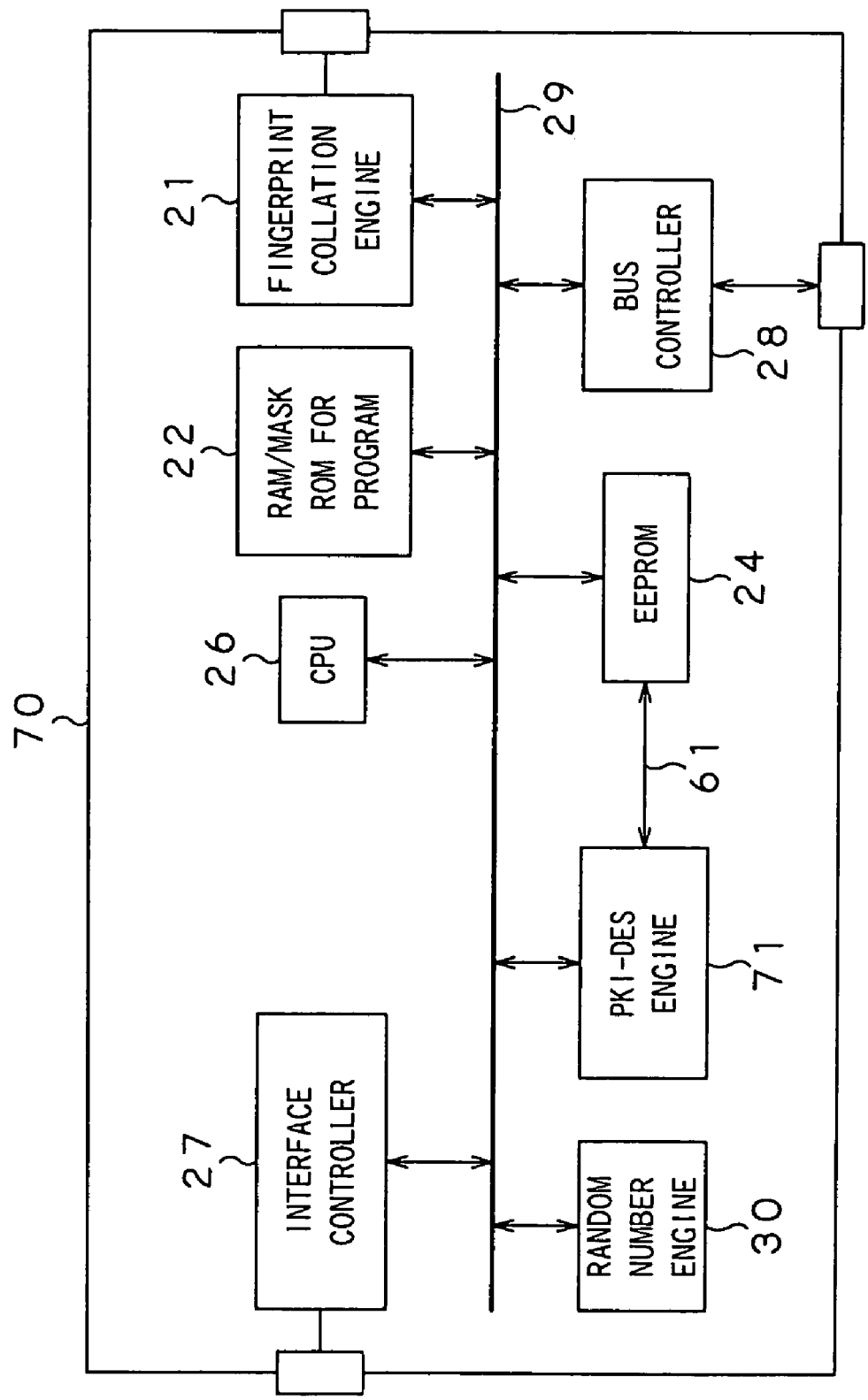
FIG. 8 is a block diagram showing a third structure of the ASIC provided to the fingerprint collating apparatus.

Moreover, the technique of encrypting the secret key using the DES key may be applied by employing, in the fingerprint collating apparatus 10, an ASIC 70, configured as shown in FIG. 8, in place of the ASIC 20.

The ASIC 70 uses a PKI-DES engine 71, in place of the PKI engine 23 of ASIC 60 shown in FIG. 7. The PKI-DES engine 71 uses a PKI-DES core 72, in place of the PKI core 34 of the PKI engine 23 shown in FIG. 3.

The PKI-DES core 72 of the PKI-DES engine 71 is able to carry out the processing of encryption and decryption, by the DES key, in addition to the processing employing the secret key in accordance with the PKI system.

The operation of the ASIC 70, shown in FIG. 8, will now be explained.

When the power supply of the ASIC 70 is turned on, the DES key is generated by the random number engine 30, under control by the CPU 26. Two 8-byte DES keys, for example, are generated at this time, based on the triple DES system, which reinforces the key by executing encryption processing by DES three times on end.

The generated triple DES keys are written in the EEPROM 24 via PKI-DES engine 71 and dedicated bus 61.

When the PKI keys, that is, the secret key and the public key, have been generated, the PKI-DES engine 71 reads out the triple DES keys from the EEPROM 24, over the dedicated bus 61, to encrypt the secret key to generate encrypted key data. The so generated encrypted key data and the public key are output to outside the PKI-DES engine 71 so as to be stored in the flash memory 14.

If, in data signing, data encryption and in decrypting the data encrypted with the public key, the secret key is used, the encrypted key data, stored in the flash memory 14, is read out and stored in the key register 32 of the PKI-DES engine 71, under control by the CPU 26.

The PKI-DES core 72 of the PKI-DES engine 71 then reads out the triple DES keys, stored in the EEPROM 24, to decrypt the encrypted data, stored in the key register 32, into a secret key.

Thus, in decrypting the encrypted key data, obtained on encryption using the triple DES keys, into the secret key, by the PKI-DES engine 71, it is prerequisite that the fingerprint collation has been made by the fingerprint collation engine 21.

By encrypting the secret key, in this manner, using the DES key, the PKI key may be generated limitlessly with the EEPROM 24 of a smaller capacity. The EEPROM 24 may be any suitable memory provided that the memory used permits data writing and data readout. Consequently, an inexpensive memory may be used to lead to cost reduction.

Although the PKI-DES engine 71 encrypts the secret key using the triple DES system, it is of course possible to encrypt the secret key with a sole usual DES key.

Figure 10:
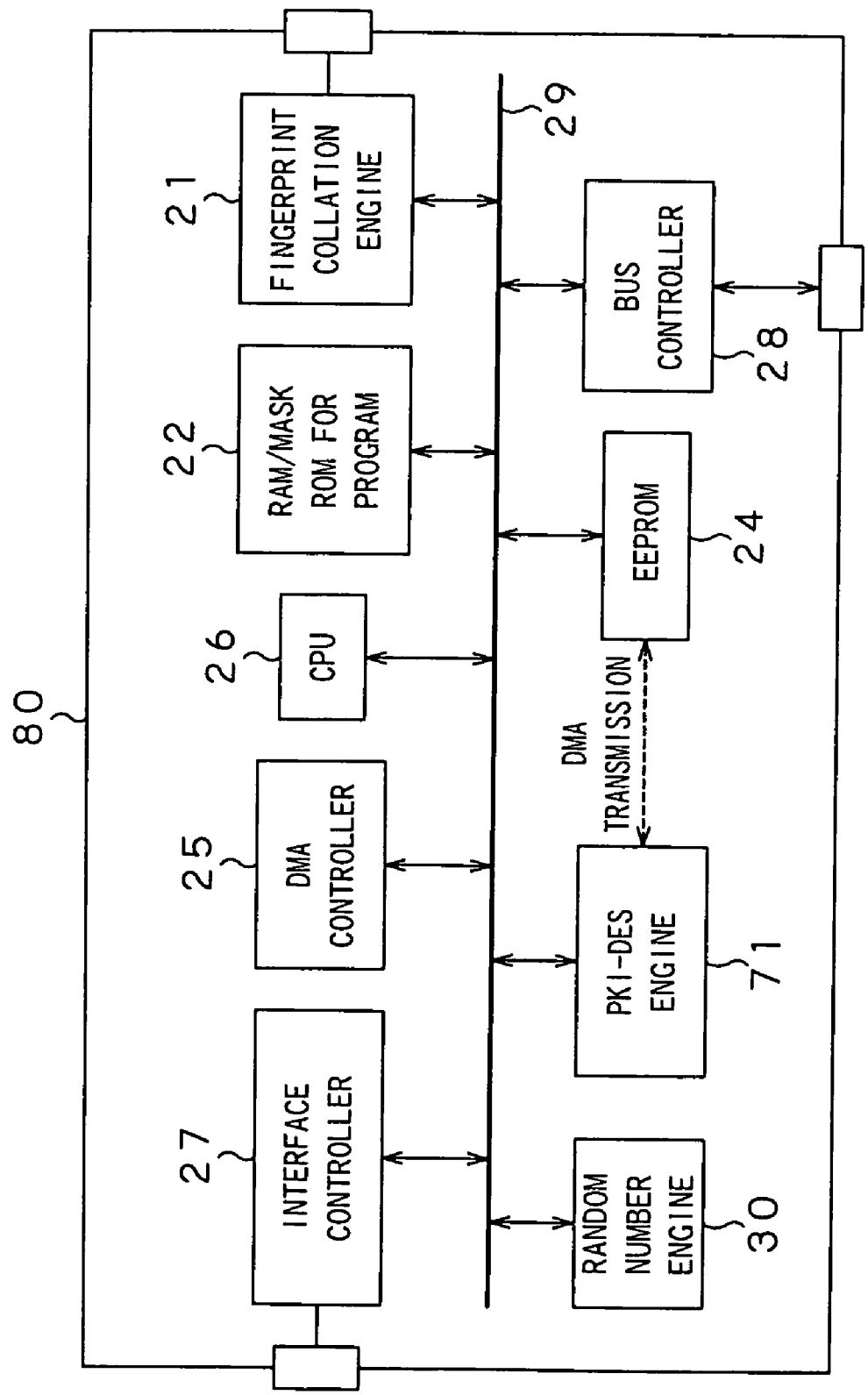
FIG. 10 is a block diagram showing a fourth structure of the ASIC provided to the fingerprint collating apparatus.

With the use of an ASIC 80, configured as shown in FIG. 10, it is possible to apply another technique for encrypting the secret key using a DES key.

Figure 9:
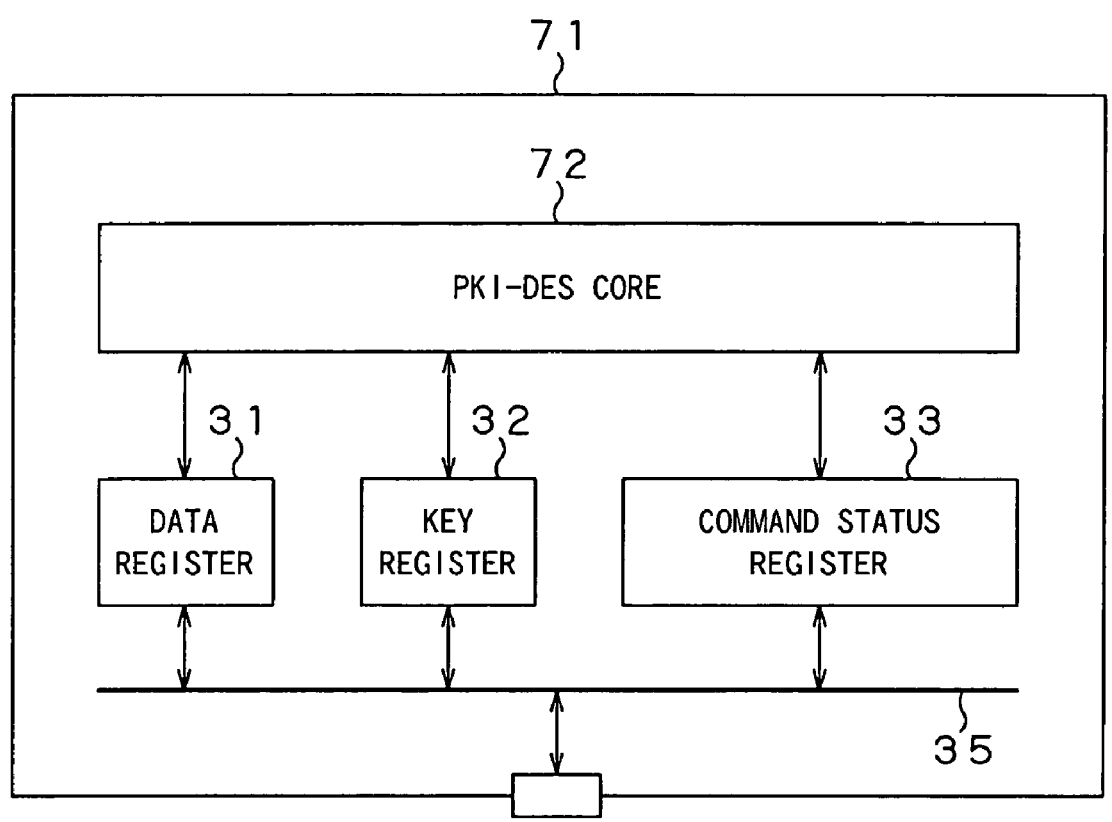
FIG. 9 is a block diagram showing a second structure of a PKI engine within the ASIC.

In the ASIC 80, the PKI-DES engine 71, shown in FIG. 9, is used in place of the PKI engine 23 in the ASIC 20 shown in FIG. 3.

The operation of the ASIC 89 will now be explained in detail.

When the power supply of the ASIC 80 us turned on, a DES key is generated by the random number engine 30, under control by the CPU 26.

The so generated DES key is written in the W area 42 of the EEPROM 24, via PKI-DES engine 71, by the DMA controller 25, controlled by the CPU 26.

When the PKI-DES engine 71 has generated the PKI keys, that is, the secret key and the public key, the DMA controller 25 directly accesses the W area 42 of the EEPROM 24 to read out the DES key to transfer the so read out DES key to the PKI-DES engine 71.

The PKI-DES engine 71 encrypts the secret key to generate encrypted data, using the so transferred DES key. The so generated encrypted key data and the public key are output to outside the PKI-DES engine 71 for storage in the flash memory 14.

If, in the data signing, data encryption or in the decryption of the data encrypted with the public key, a secret key is used, the encrypted key data stored in the flash memory 14 is read out by the CPU 26 and stored in the key register 32 of the PKI-DES engine 71.

The DMA controller 25 then reads out the DERS key stored in the EEPROM 24 and transfers the so read out key to the PKI-DES engine 71.

The PKI-DES core 72 of the PKI-DES engine 71 decrypts the encrypted key data, stored in the key register 32, into the secret key, using the so transferred key register 32.

When the encrypted key data is to be decrypted into the secret key, by the PKI-DES engine 71, using the DES key, it is a prerequisite that the user's fingerprint has been authorized by the fingerprint collation engine 21.

Meanwhile, in the fingerprint collating apparatus 10, employing the present invention, the secret key, generated on the basis of the PKI system, is usable responsive to the authentication of the user's fingerprint, However, the present invention is not limited to the fingerprint authentication, so that the secret key may be used in conjunction with authentication of the living body information or with authentication attendant on inputting e.g. a password.

The present invention is not limited to the above-described embodiments and various modifications, substitutions or equivalents may be envisaged without departing from the scope of the invention as defined in the claims. Industrial Applicability According to the present invention, described above, the secret key, used for security processing, based on the PKI system, is written in a dedicated area of memory means that may be read solely by a predetermined transmitting means and, based on the results of authentication of the information for authentication, the secret key is transmitted to a PKI processing means. Since this prohibits the secret key from being read out by illicit access from outside, it becomes possible to hold a high security level through elimination of illicit outflow of crucial data, data falsification or impersonation on the network. Moreover, according to the present invention, the storage means in which to write a secret key is connected over a dedicated bus to the PKI processing means, so that a mechanism for preventing the secret key from being read out by illicit access from outside may be realized by a simplified structure. In addition, according to the present invention, the secret key is encrypted by a DES key and the so encrypted DES key is written in a storage means over a dedicated bus or in a dedicated area of the storage means that can be read out solely by a preset transmitting means. The secret key is transmitted to the PKI processing means depending on the results of authentication of the information for authentication. In this manner, the secret key may be prohibited from being read out by illicit access from outside, while the storage means may be reduced in capacity, and the PKI key may be manufactured limitlessly, thus enabling cost reduction.

The invention claimed is:

1. A removable authentication apparatus connected to an external apparatus, comprising
   inputting means for inputting the information for authentication;
   authentication means for authenticating said information for authentication, entered by said inputting means;
   a CPU (central processing unit) formed in an integrated circuit for comprehensively controlling an inner bus and said authentication means;
   PKI processing means for generating a secret key and a public key based on a PKI (Public Key Infrastructure) system for performing predetermined security processing with the secret key generated;
   storage means having a write-only area in which the secret key generated by said PKI processing means is written and which cannot be read out from outside, writing in said write only area being possible only by a write operation by said CPU;
   secret key transmitting means for directly accessing said write only area of said storage means, responsive to authentication of said information for authentication, by said authentication means, and for transmitting said secret key written in said write only area only between said PKI processing means and said storage means; and
   encrypted data generating means for encrypting data supplied from said external device by a DES (Data Encryption Standard) system key generated in accordance with the DES system to generate encrypted data;
   said PKI processing means encrypting said DES key to generate encrypted key data, using said secret key transmitted by said secret key transmitting means, by way of performing said predetermined security processing.

2. The authentication apparatus according to claim 1 wherein said information for authentication is the fingerprint information.

3. The authentication apparatus according to claim 1 wherein said PKI processing means generates an electronic signature from data supplied from said external apparatus using said secret key transmitted by said secret key transmitting means by way of performing said predetermined security processing.

4. The removable authentication apparatus according to claim 1 wherein said PKI processing means decrypts the encrypted data obtained on encryption by a public key for said secret key, using said secret key transmitted by said secret key transmitting means, by way of performing said predetermined security processing.

5. The removable authentication apparatus according to claim 1 wherein
   said inputting means inputs the information on a living body as the information for authentication; and wherein
   said authentication means performs the authenticating processing for the information on the living body as entered by said inputting means.

6. A security processing method for a removable authentication apparatus, connected to an external apparatus, said method comprising
   a step of inputting the information for authentication;
   an authentication step of authenticating said information for authentication, entered by said inputting step;
   a key generating step of generating a secret key and a public key by PKI processing means performing predetermined security processing based on the PKI (Public Key Infrastructure) system;
   a write step of writing a secret key generated by said key generating step in storage means having a write only area from which readout from outside is not possible;
   a secret key transmitting step of directly accessing said write only area of said storage means responsive to authentication of said information for authentication by said authentication step to transmit the written secret key to said PKI processing means; and
   an encrypted data generating step of encrypting from said external device by a DES key generated based on the DES (Data Encryption Standard) system, for generating encrypted data;

said PKI processing means encrypting said DES key using said secret key transmitted by said secret key transmitting step to generate encrypted key data by way of performing said preset security processing.

7. The security processing method as defined in claim 6 wherein said PKI processing means generates an electronic signature from data supplied from said external device, using said secret key transmitted by said secret key transmitting step, by way of performing said preset security processing.

8. The security processing method as defined in claim 6 wherein
said PKI processing step decrypts the data encrypted by a public key for said secret key, using said secret key transmitted by said secret key transmitting step, by way of performing said preset security processing.

9. The security processing method as defined in claim 6 wherein
said inputting step inputs the information on the living body, as the information for authentication, and wherein said authentication step performs authentication processing of the information on the living body, as entered in said inputting step.

10. A removable authentication apparatus connected to an external apparatus, comprising
inputting means for inputting the information for authentication;
authentication means for authenticating said information for authentication, entered by said inputting means;
a CPU (central processing unit) formed in an integrated circuit for comprehensively controlling an inner bus and said authentication means;
PKI processing means for generating a secret key and a public key based on a PKI (Public Key Infrastructure) system for performing predetermined security processing with the secret key generated;
storage means connected over a dedicated bus to said PKI processing means and having a write only area in which said secret key is written and which cannot be read out from outside, writing in said write only area being possible only by a write operation by said CPU (central processing unit);
said PKI processing means reading out said secret key written in said write only area of said storage means, solely over another dedicated bus, solely interconnecting said PKI processing means and said storage means, responsive to authentication by said authentication means of said information for authentication; and
encrypted generating means for encrypting data supplied from said external device by a DES key generated based on the DES (Data Encryption Standard) system to generate encrypted data;
said PKI processing means encrypting said DES key using said secret key read out via said dedicated bus to generate encrypted key data by way of performing said predetermined security processing.

11. The authentication apparatus according to claim 10 wherein said information for authentication is the fingerprint information.

12. The authentication apparatus according to claim 10 wherein said PKI processing means generates an electronic signature from data supplied from said external device, using said secret key read out over said dedicated bus, by way of performing said predetermined security processing.

13. The authentication apparatus according to claim 10 wherein said PKI processing means decrypts data encrypted with a public key for said secret key, using said secret key read out over said dedicated bus, by way of performing said predetermined security processing.

14. The authentication apparatus according to claim 10 wherein said inputting means inputs the information on the living body, as the information for authentication, and wherein said authentication step performs authentication processing of the information on the living body, as entered in said inputting step.

15. A security processing method for a removable authentication apparatus connected to an external apparatus, said method comprising
a step of inputting the information for authentication;
an authentication step of authenticating said information for authentication, entered by said inputting step;
a key generating step of generating a secret key and a public key by PKI processing means performing predetermined security processing based on the PKI (Public Key Infrastructure) system;
a writing step of writing a secret key, generated by said key generating step, in storage means connected over a dedicated bus to said PKI processing means, said storage means having a write only area from which readout from outside is not possible;
said PKI processing means reading out said secret key, written in said write only area of said storage means, over said dedicated bus, responsive to authentication by said authentication means of said information for authentication; and
an encrypted data generating step of encrypting data supplied from said external device by a DES key generated based on the DES (Data Encryption Standard) system for generating encrypted data;
said PKI processing means encrypting said DES key using said secret key read out over said dedicated bus to generate encrypted key data by way of performing said preset security processing.

16. The security processing method as defined in claim 15 wherein an electronic signature is generated from data supplied from said external device, using said secret key supplied by said external device, by way of performing said preset security processing.

17. The security processing method as defined in claim 15 wherein
said PKI processing means decrypts the data encrypted by a public key for said secret key, using said secret key read out over said dedicated bus, by way of performing said preset security processing.

18. The security processing method as defined in claim 15 wherein
said inputting step inputs the information on the living body, as the information for authentication, and wherein said authentication step performs authentication of the information for the living body, as entered in said inputting step.

19. A removable authentication apparatus connected to an external apparatus, comprising
inputting means for inputting the information for authentication;
authentication means for authenticating said information for authentication, entered by said inputting means;
a CPU (central processing unit) formed in an integrated circuit for comprehensively controlling an inner bus and said authentication means;
PKI-DES processing means including a PKI part for generating a secret key and a public key based on a PKI (Public Key Infrastructure) system for performing predetermined security processing with the secret key generated, and a DES key generating part for generating a first DES key based on the DES (Data Encryption Standard) system;

storage means connected to said PKI processing part over a dedicated bus; said first DES key, generated by said DES key generating part, being written in said storage means;

said PKI processing means after generating said secret key reading out said first DES key, written in said storage means, over said dedicated bus, and encrypting said secret key, using the read out first DES key, to generate an encrypted secret key;

said PKI processing means reading out said first DES key written in said storage means, solely over another dedicated bus, solely interconnecting said PKI processing means and said storage means, responsive to authentication by said authentication means of said information for authentication; and encrypted data generating means for encrypting data supplied from said external device by a second DES key generated in accordance with the DES system to generate encrypted data;

said PKI processing means encrypting said second DES key to generate encrypted key data, using said secret key decrypted from the encrypted secret key with said first DES key read out over said dedicated bus, by way of performing said predetermined security processing.

20. The removable authentication apparatus according to claim 19 wherein said information for authentication is the fingerprint information.

21. The removable authentication apparatus according to claim 19 wherein the encrypted secret key generated is stored in a non-volatile memory outside said integrated circuit.

22. The removable authentication apparatus according to claim 19 wherein said PKI processing means generates an electronic signature from data supplied from said external device, using said secret key read out over said dedicated bus, by way of performing said predetermined security processing.

23. The removable authentication apparatus according to claim 19 wherein said PKI processing means decrypts the encrypted data, obtained on encryption by a public key for said secret key, using said secret key decrypted from said encrypted secret key by said first DES key as read out over said dedicated bus, by way of performing said predetermined security processing.

24. The removable authentication apparatus according to claim 19 wherein said inputting means inputs the information on a living body as the information for authentication; and wherein said authentication means performs the authentication for the information on the living body as entered by said inputting means.

25. The removable authentication apparatus according to claim 19 wherein said DES key generating means generates said first DES key based on the triple DE system; and wherein said PKI processing means encrypts said secret key in accordance with said triple DES system to generated an encrypted secret key.

26. A security processing method for a removable authentication apparatus connected to an external apparatus, said method comprising a step of inputting the information for authentication;

an authentication step of authenticating said information for authentication, entered by said inputting step;

a controlling step of controlling an inner bus and said authentication means by a CPU (central processing unit) formed in an integrated circuit;

a key-DES key generating step of generating a secret key and a public key by a PKI part performing predetermined security processing based on the PKI (Public Key Infrastructure) system and of generating a first DES key based on the DES (Data Encryption System);

a write step of writing the first DES key, generated by said key-DES key generating step, in storage means connected over a dedicated bus to said PKI processing means;

said PKI processing unit after generating said secret key reading out said first DES key, written in said storage means, over said dedicated bus, and encrypting said secret key, using the read out first DES key, to generate an encrypted secret key;

said PKI processing unit reading out said first DES key, written in said storage means, solely over said dedicated bus, solely interconnecting the PKI-DES processing means and said storage means, responsive to authentication by said authentication step of the information for authentication, and decrypting said encrypted secret key into said secret key, using the read-out first DES key; and an encrypted data generating step of encrypting data supplied from said external device, by a second DES key generated on the basis of the DES system, to generate encrypted data;

said PKI-DES processing means encrypting said second DES key to generate encrypted key data, using said secret key decrypted from the encrypted secret key by said first DES key read out over said dedicated bus, by way of performing said predetermined security processing.

27. The security processing method according to claim 26 wherein said information for authentication is the fingerprint information.

28. The security processing method according to claim 26 wherein the encrypted secret key generated is stored in a non-volatile memory outside said integrated circuit.

29. The security processing method according to claim 26 wherein said PKI-DES processing means generates an electronic signature from data supplied from said external device, using said secret key decrypted from the encrypted secret key with said first DES key read out over said dedicated bus, by way of performing said predetermined security processing.

30. The security processing method according to claim 26 wherein said PKI-DES processing means decrypts the encrypted data, obtained on encryption by a public key for said secret key, using said secret key decrypted from said encrypted secret key by said first DES key read out over said dedicated bus, by way of performing said predetermined security processing.

31. The security processing method according to claim 26 wherein said inputting step inputs the information on a living body as the information for authentication, and wherein said authentication step performs the authentication for the information on the living body as entered by said inputting step.

32. The security processing method according to claim 26 wherein said DES key generating step generates said first DES key based on the triple DES system; and wherein said PKI-DES processing means encrypts said secret key in accordance with said triple DES system to generate an encrypted secret key.

33. A removable authentication apparatus connected to an external apparatus, comprising
   inputting means for inputting the information for authentication;
   authentication means for authenticating said information for authentication, entered by said inputting step;
   a CPU (central processing unit) formed in an integrated circuit for comprehensively controlling an inner bus and said authentication means;
   PKI (Public Key Infrastructure)-DES processing means having a PKI part for generating a secret key and a public key by a PKI system for performing predetermined security processing using the generated secret key, and a DES(Data Encryption System) key generating part for generating a first DES key based on the DES system;
   storage means having a write only area from which readout from outside is not possible, said first DES key generated by said DES key generating means being written in said write only area; and
   DES key transmitting means for directly accessing said write only area of said storage means without the CPU taking part in transmission, over an inner bus, to transmit the DES key solely between said PKI-DES processing means and said storage means;
   said DES key transmitting means on generation of said secret key reading out said first DES key written in said write only area of said storage means to transmit the so read out first DES key to said PKI-DES processing means;
   said PKI-DES processing means encrypting said secret key using said first DES key transmitted by said DES key transmitting means;
   said DES key transmitting means reading out said first DES key written in said storage means responsive to authentication of said information for authentication by authentication means;
   said PKI-DES processing means decrypting said encrypted secret key to said secret key using said first DES key transmitted by said DES key transmitting means.

34. The removable authentication apparatus according to claim 33 wherein said information for authentication is the fingerprint information.

35. The removable authentication apparatus according to claim 33 wherein said PKI processing means generates an electronic signature from data supplied from said external device, using said secret key decrypted from the encrypted secret key with said first DES key transmitted by said DES key transmitting means, by way of performing said predetermined security processing.

36. The removable authentication apparatus according to claim 33 further comprising
   encrypted data generating means for encrypting data supplied from said external device, by a second DES key generated on the basis of the DES system, to generate encrypted data;
   said PKI processing means encrypting said second DES key to generate encrypted key data, using said secret key decrypted from the encrypted secret key by said first DES key transmitted by said DES key transmitting means, by way of performing said predetermined security processing.

37. The removable authentication apparatus according to claim 33 wherein said PKI processing means decrypts the encrypted data, obtained on encryption by a public key for said secret key, using said secret key decrypted from said encrypted secret key by said first DES key transmitted by said DES key transmitting means, by way of performing said predetermined security processing.

38. The removable authentication apparatus according to claim 33 wherein
   said inputting means inputs the information on a living body as the information for authentication, and wherein said authentication means performs the authentication for the information on the living body as entered by said inputting means.

39. The removable authentication apparatus according to claim 33 wherein
   said DES key generating means generates said first DES key based on the triple DES system, and wherein
   said PKI processing unit encrypts said secret key in accordance with said triple DE system to generated an encrypted secret key.

40. A security processing method for a removable authentication apparatus connected to an external apparatus, said method comprising
   a step of inputting the information for authentication;
   an authentication step of authenticating said information for authentication, entered by said inputting step;
   a controlling step of controlling a an inner bus and said authentication means by a CPU (central processing unit) formed in an integrated circuit;
   a PKI-DES processing step of generating a secret key and a public key by a PKI processing part performing predetermined security processing based on the PKI (Public Key Infrastructure) system and of generating a first DES key based on the DES (Data Encryption Standard) system;
   a write step of writing said first DES key, generated by said PKI-DES key processing step, in storage means having a write only area from which readout from outside is not possible; and
   a DES key transmitting step of directly accessing said write only area of said storage means, without said CPU taking part in transmission, over an inner bus, to transmit the DES key solely between said PKI-DES processing means taking charge of said PKI-DES processing and said storage means;
   said DES key transmitting step on generation of said secret key reading out said first DES key written in said write only area of said storage means to transmit the so read out first DES key to said PKI-DES processing means;
   said PKI-DES processing step encrypting said secret key to generate an encrypted secret key using said first DES key transmitted by said DES key transmitting means;
   said DES key transmitting step reading out said first DES key written in said storage means, responsive to authentication by said authentication step of said information for authentication;
   said PKI processing means decrypting said encrypted secret key to said secret key using said first DES key transmitted by said DES key transmitting step.

41. The security processing method according to claim 40 wherein said PKI-DES processing means generates an electronic signature from data supplied from said external device, using said secret key decrypted from the encrypted secret key, using said first DES key transmitted by said DES key transmitting means, by way of performing said predetermined security processing.

42. The security processing method according to claim 40 further comprising an encrypted data generating step of encrypting data supplied from said external device, by a second DES key generated on the basis of the DES system, to generate encrypted data;

said PKI-DES processing means encrypting said second DES key to generate encrypted key data, using said secret key decrypted from the encrypted secret key by said first DES key transmitted by said DES key transmitting step, by way of performing said predetermined security processing.

43. The security processing method according to claim 40 wherein said PKI processing means decrypts the encrypted data, obtained on encryption by a public key for said secret key, using said secret key decrypted from said encrypted secret key by said first DES key transmitted by said DES key transmitting step, by way of performing said predetermined security processing.

44. The security processing method according to claim 40 wherein said inputting step inputs the information on a living body as the information for authentication, and wherein said authentication step performs the authentication for the information on the living body as entered by said inputting means.

45. The security processing method according to claim 40 wherein said DES key generating step generates said first DES key based on the triple DES system; and wherein said PKI-DES processing means encrypts said secret key in accordance with said triple DES system to generate an encrypted secret key.

* * * * *